United States Patent [19]

Heinz et al.

[11] Patent Number: 4,561,729

[45] Date of Patent: Dec. 31, 1985

[54] COUNTERELECTRODE FOR AN ELECTROCHROMIC INDICATING DEVICE

[75] Inventors: Jutta Heinz, Gerlingen; Helmut Sautter, Ditzingen; Rainer Schink, Leonberg; Lothar Weber, Stuttgart, all of Fed. Rep. of Germany

[73] Assignee: Robert Bosch GmbH, Stuttgart, Fed. Rep. of Germany

[21] Appl. No.: 478,271

[22] Filed: Mar. 25, 1983

[30] Foreign Application Priority Data

Mar. 30, 1982 [DE] Fed. Rep. of Germany ....... 3211637

[51] Int. Cl.⁴ .................................................. G02F 1/17
[52] U.S. Cl. .................................................... 350/357
[58] Field of Search ................. 350/357, 363; 427/122, 427/125; 252/502, 503; 429/217; 340/785

[56] References Cited

U.S. PATENT DOCUMENTS

| 3,321,286 | 5/1967 | Clark et al. | 252/503 |
| 3,767,750 | 10/1973 | Groszek et al. | 252/503 |
| 3,829,196 | 8/1984 | Deb | 350/160 |

FOREIGN PATENT DOCUMENTS

| 990784 | 2/1978 | Canada | 429/217 |
| 19846 | 2/1978 | Japan | 350/357 |
| 7778 | 1/1980 | Japan | 350/357 |
| 6826 | 1/1982 | Japan | 350/357 |
| 32421 | 2/1982 | Japan | 350/357 |

OTHER PUBLICATIONS

Arita et al., "WO3-Type Electrochromic Display" National Technical Report (Japan) vol. 28 #1, 2-1978, pp. 54-62.

*Primary Examiner*—William H. Punter
*Attorney, Agent, or Firm*—Frishauf, Holtz, Goodman & Woodward

[57] ABSTRACT

The counterelectrode (16) of an electrochromic indicator device is made of a paste of activated carbon and an organic binder baked on a metal plate (15). The shape of the metal plate can be dished after the layer is baked on without damage. Activated carbon in the counterelectrode, operating with the usual electrolyte and a transition metal oxide electrochromic electrode, makes possible a high-charge density from migration of ions with the application of very small voltages. The electrochromic effect can be extinguished simply by a short-circuit, especially if polyvinyl alcohol is provided as a supplementary binder by dipping the baked counterelectrode therein and baking again, and even more so if the activated carbon paste contains finely divided gold from decomposition of a gold compound during baking. The counterelectrode layer can be applied by screen printing.

11 Claims, 1 Drawing Figure

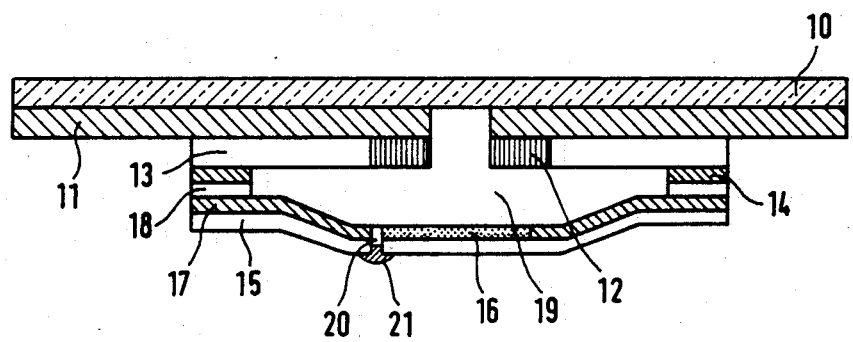

COUNTERELECTRODE FOR AN ELECTROCHROMIC INDICATING DEVICE

This invention concerns the counterelectrode, and the method of its manufacture, of an electrochromic indicating device. Such devices are used, for example, for instrument panels and dials in motor vehicles, aircraft, etc.

Such an indicating device is described, for example, in U.S. Pat. No. 4,215,917. The device there shown has a graphite sheet for its counterelectrode, which is relatively thick and has certain side reactions. Furthermore, the method of manufacture of this known graphite sheet is relatively complicated and expensive because of the great number of necessary process steps.

Counterelectrodes are also known which are made of thick resistant pastes or of similar mixtures of carbon black, graphite and organic binders. These have such a small charging capacity for negative and positive ions that during a charge with 10 $mC/cm^2$ the potential of these electrodes changes by more than 0.5 volts.

SUMMARY OF THE INVENTION

It is an object of the present invention to provide a counterelectrode that is readily producible with few process steps and provides a particularly high charging capacity for positive and negative ions.

Briefly, the counterelectrode is made of a paste of activated a carbon and organic binder that is baked on substrate as a layer which preserves to a very high extent the very large interior active surface of the activated carbon. The substrate can conveniently be of sheet metal.

Electrochromic indicator devices provided with a counterelectrode in accordance with the present invention have the advantage of being capable of easy manufacture and have a charging capacity for positive and negative ions that is great enough that during a charge with 10 $mC/cm^2$ the potential of the electrode changes by substantially less than 0.5 volts and preferably by less than 0.1 volts. The switching time of an electrochromic indicating device embodying the invention is less than one second for a writing voltage of 0.5 volts and extinction can be accomplished in a simple way by short-circuiting. The counterelectrode layer can be applied by well-known coating methods such as spraying, stamping, rolling or electrophoretic deposition. Application by a screen printing process has been found particularly effective. The coating is so elastic that it maintains its integrity on a metallic substrate when deformed with the substrate, withstanding even deep drawing without damage if the depth of drawing does not exceed a distance of about 0.5 mm. The layer thickness is reproducible and small, so that especially flat cells can be produced.

Activated carbon of plant origin has been found particularly suitable as the active material of the counterelectrode coating because of the particularly large inner surface of this kind of activated carbon. Among the various kinds of vegetable activated carbons, particularly good effects have resulted form the use of beech wood carbon, the structure of which noticeably well promotes activation.

From the point of view of process technology, the screen printing process has been found particularly effective for applying the counterelectrode. In this process a paste is made of a granulate of activated carbon and a binder, like varnish or epoxy resin, which is suitable for the screen printing process. The paste is printed on the substrate and then baked on. A particularly stable binder for the activated carbon which is capable of withstanding organic solvents of the electrolyte is polyvinyl alcohol, which is soluble, however, only in water and for this reason is not directly suitable for screen printing. By a special process described below, however, there is obtained a particularly durable bonding of the activated carbon and, in addition, a protective layer for a metallic substrate without any additional process expense. By the addition of gold in a finely divided state to the counterelectrode paste, the self-extinguishing of the electrochromic indicator device by a simple short-circuit can be still further improved.

THE DRAWING

The invention is further described by way of illustrative example and in much greater detail, with useful improvements, with reference to the annexed drawing, the single FIGURE of which shows, in a schematic representation, a cross-section through an electrochromic indicating device.

DESCRIPTION OF THE ILLUSTRATED EMBODIMENT

The drawing shows, in cross-section, an electrochromic indicator device having a glass plate 10 as its exterior substrate on the side facing the observer. On the glass plate 10 there has been applied a transparent conductive layer 11 for supplying current to the device. A layer 12 of a configuration presenting a desired outline or image to the observer adheres to the conductive layer 11. The layer 12 consists of an oxide of a transition metal, for example $WO_3$, $MoO_3$, $V_2O_5$, $Nb_2O_5$ or other materials as specified in U.S. Pat. No. 3,829,796, issued on an application filed Apr. 10, 1973. Laterally surrounding the layer 12 practically without intermediate space, is a protective layer 13 which covers, on the inside of the indicator device, the conductive layer 11. At the outer edge of the indicator device a bonding layer 14 for promoting adhesion covers the rim portion of the protective layer 13.

The further construction of the electrochromic indicator device involves a second substrate on the part of the device facing away from the observer. The second substrate 15, which does not need to be either transparent or translucent, consists in the present case of a metal plate. It carries a counterelectrode 16 which is thus mounted in the neighborhood of the layer 12, but spaced from the latter. Another adhesion promoting layer 17 extends outward from the outer edge of the counterelectrode 16 and provides both electrical insulation and chemical isolation of the metal plate 15. The two substrates 10 and 15 are fastened to each other by an adhesive 18 which bonds excellently on the adhesion promoting layers 14 and 17 and completes a tight seal of the cell. The interior space of the device is filled with an electrolyte 19 of the kind described below which is introduced through a fill opening 20. After filling with the electrolyte is complete, the fill opening 20 is closed by a solder plug 21.

The conductive layer 11 on the interior side of the gass plate 10 consists of transparent material, for example of $In_2O_3/Sb$, while the electrochromic layer 12, as already mentioned, consists of the oxide of a transition metal. The metal plate 15, which provides the substrate facing away from the observer, is produced by deep-drawing following the application of the counterelectrode 16 and of the adhesion promoting layer 17, both of which have sufficient elasticity and coherence to permit the deep-drawing process to be performed without damage. The electrolyte 19 contains a lithium salt (LiClO$_4$, LiBF$_4$ or LiAsF$_6$, for example) which is dissolved in an organic solvent such as propylene carbonate or γ-butyric lactone. The counterelectrode has a layer thickness in the range from 10 to 70 μm.

The activity of the electrochromic indicating device just described is in the nature of a coloring of the electrochromic layer 12 when a voltage in the range from 0.5 to 2 volts, negative with respect to the potential of the metal plate 15, is applied through the conductive layer 11. Removal of the coloring (decoloring) occurs upon reverse polarity or by a short-circuit, as will be further explained below. The coloring is produced by the wandering of Li$^+$ ions out of the electrolyte 19 into the layer 12 and at the same time out of the counterelectrode 16 into the electrolyte 19. Decoloring results from ion drift in the opposite direction. The layer 17 fulfills the function of an insulating layer with respect to the electrolyte 19 and at the same time an adhesion promoting layer in the region of the seal 18. The layer 17 does not participate in the electrochemical processes.

The counterelectrode 16 has the capability of picking up ions or giving them off, according to the polarity of the applied voltage. These events should take place at the smallest possible voltage drop and be reversible. This means that they should proceed without disturbing side reactions. The potential of the counterelectrode 16 should be as constant as possible up to charging with 10 mC/cm$^2$. The charge density that leads to a potential change of one volt serves as a measure for the quality of the electrochromic indicator device. Since this magnitude has the dimension of a capacitance density, it is designated as specific charge capacity.

This property is obtained by utilizing activated carbon of high specific surface, and only such binders which do not substantially lower this high specific surface, so that the adsorption of ions in great density is made possible.

A vegetable activated carbon is used as the active material of the counterelectrode 16 of a kind that possesses a structure particularly favorable for activation and has a great internal surface. A suitable product, for example, is obtainable in commerce under the designation NORIT BRX. The activated carbon is used in the form of a granulate having a grain size in the range from 0.2 to 20 μm. A paste is made with addition of binder to the granulate for applying the mixture in the form of a thin layer, which is put on the inner side of the metal plate 15 and there forms a firmly bonded coating with the desired properties after a baking process. Single component epoxy resin, varnish and polyvinyl alcohol, have been found particularly effective as binders. Single component epoxy resin and varnish permit the production of pastes capable of application by screen printing, but the activated carbon particles can also be applied with other useful conventional coating methods. What is essential is that the counterelectrode should not be constituted as a separate plate, foil, sintered body, felt, web or the like, since these would make necessary further measures for firmly adhesive connection with the metal plate 15. An important further condition is the stability of the counterelectrode layer, in particular against attack of the electrolyte 19 up to a temperature of +85° C. For producing a paste capable of screen printing, the epoxy resin or the varnish is mixed with activated charcoal granulate in a ratio, by weight, in the range from 2:1 to 1:1. The varnish is a mixture of one or more members of the group of polymethylmethacrylates, which are cross-linkable with amines and a mixture of solvents, well known to those familiar with the art of varnish preparation. (e.g. aromatics, ketones and esters of medium carbon number, preferably C$_5$ to C$_{11}$) A commercially available epoxy resin suitable for this application is known under the designation EK12 of the Wevo-Chemical co. A suitable type of varnish is a acrylate-melamine system sold by the Lesonal co.

Polyvinyl alcohol is particularly suitable as a binder for the activated carbon, because it is very resistant against organic solvents. It is not suitable, however, for direct treatment in screen printing, because it is soluble only in water and aqueous pastes are not suitable for screen printing. Since the provision of the counterelectrode 16 by a screen printing process is a particularly advantageous process, the following treatment is utilized: first a paste suitable for screen printing is applied on the metal plate 15, the paste being made with the incorporation of additives which almost completely evaporate or decompose during baking, so that a carbon layer results which has just sufficient adhesion for the further treatment. Then, after printing and baking, the metal plate 15 thus coated is dipped in an aqueous 2 to 10% polyvinyl alcohol solution and the resulting coating is baked anew at 70° C. to 150° C. for producing the completed counterelectrode 16. A particular advantage of this process is that without supplementary process steps, a layer of polyvinyl alcohol is formed outside the counterelectrode 16 which serves both as the adhesion promoting layer 17 and as the protective layer for the metal plate 15 against attack by the electrolyte 19.

The activated carbon particles are firmly bonded to each other and with the metal plate 15 by the binder without loss of porosity for the necessary porous structure of the counterelectrode 16. The counterelectrode 16 has the highest specific charge capacity of 150 mC/V·cm$^2$ when the binder used is polyvinyl alcohol in the described combination with another binder for manufacture of a printable paste. A further advantage of the use of polyvinyl alcohol as a binder for the activated carbon lies in the fact that the counterelectrode 16 in this case has a particularly high electrochemical potential. This has the consequence that the indicator device can be extinguished by a short-circuit between the conductive layer 11 and the metal plate 15. Thus, the application of an extinction voltage is not absolutely necessary.

Self-extinction by short-circuiting can be further promoted if the counterelectrode 16 contains finely divided gold. This is introduced by putting gold compounds in the mass of the counterelectrode 16. The gold compounds decompose during baking of the counterelectrode, with precipitation of gold. The gold content by weight lies preferably in the region between 5 and 20%. An example of a suitable gold compound is tetrachloroauric acid which decomposes at 150° C. according to the following equation

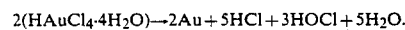

$$2(HAuCl_4 \cdot 4H_2O) \rightarrow 2Au + 5HCl + 3HOCl + 5H_2O.$$

Organic gold compounds can also be used instead of the chloroauric acid above referred to for introducing finely divided gold in the counterelectrode. Such organo-gold compounds are known for other gilding purposes and are available commercially in the corresponding channels of trade.

We claim:

1. Electrochromic indicating device having first and second substrates adjacent to but spaced from each other, said first substrate being transparent or translucent and having on its inner side a transparent electrically conductive layer and an electrode lying thereon which is composed essentially of a layer of an oxide of a transition metal, said second substrate being provided with a counterelectrode, there being an electrolyte interposed between said electrode and said counterelectrode, said counterelectrode (16) in accordance with the invention, being constituted of a mixture consisting of activated carbon and an organic binder and hardened with preservation, to a great extent, of the high magnitude of internal surface of the activated carbon.

2. Indicating device according to claim 1 in which said activated carbon of said counterelectrode (16) is activated carbon of vegetable origin.

3. Indicating device according to claim 1 in which said activated carbon is in the form of a granulate of a grain size from 0.5 to 2 $\mu$m.

4. Indicating device according to claim 2 in which said activated carbon is in the form of a granulate of a grain size from 0.5 to 2 $\mu$m.

5. Indicating device according to claim 1 in which said second substrate is of metal and said counterelectrode consists of a thin baked layer of a hardened paste of activated carbon and binder supported on said metal substrate.

6. Indicating device according to claim 5 in which said binder is a varnish.

7. Indicating device according to claim 5 in which said binder is a single component epoxy resin.

8. Indicating device according to claim 6 in which the mixture ratio of activated carbon to binder is in the range from 1:1 to 1:2.

9. Indicating device according to claim 7 in which the mixture ratio of activated carbon to binder is in the range from 1:1 to 1:2.

10. Indicating device according to claim 1 in which said activated carbon of said counterelectrode contains finely divided gold as an additive.

11. Indicating device according to claim 10 in which said finely divided gold makes up from 5% to 20% by weight of said activated carbon and its gold additive.

* * * * *